UNITED STATES PATENT OFFICE.

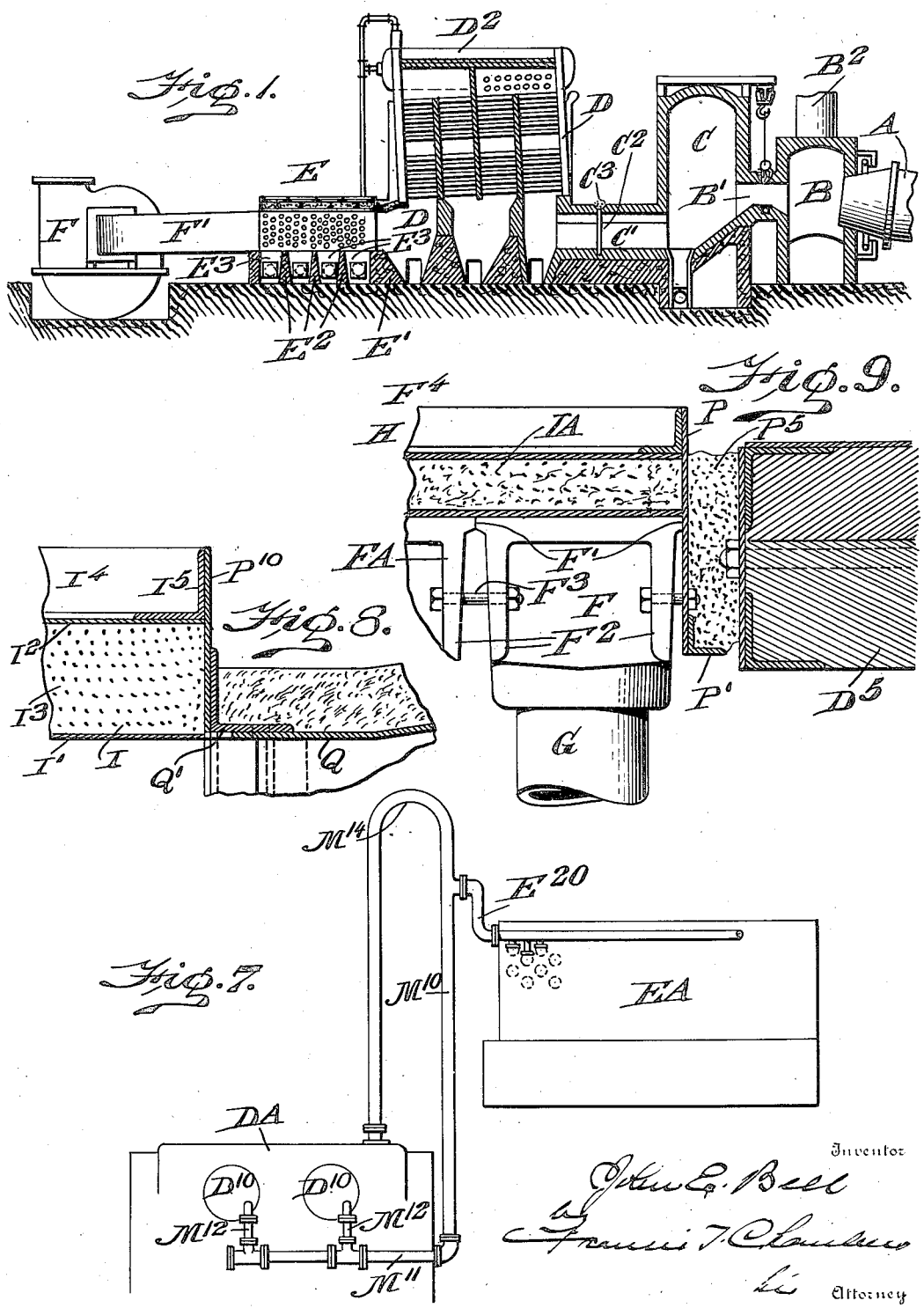

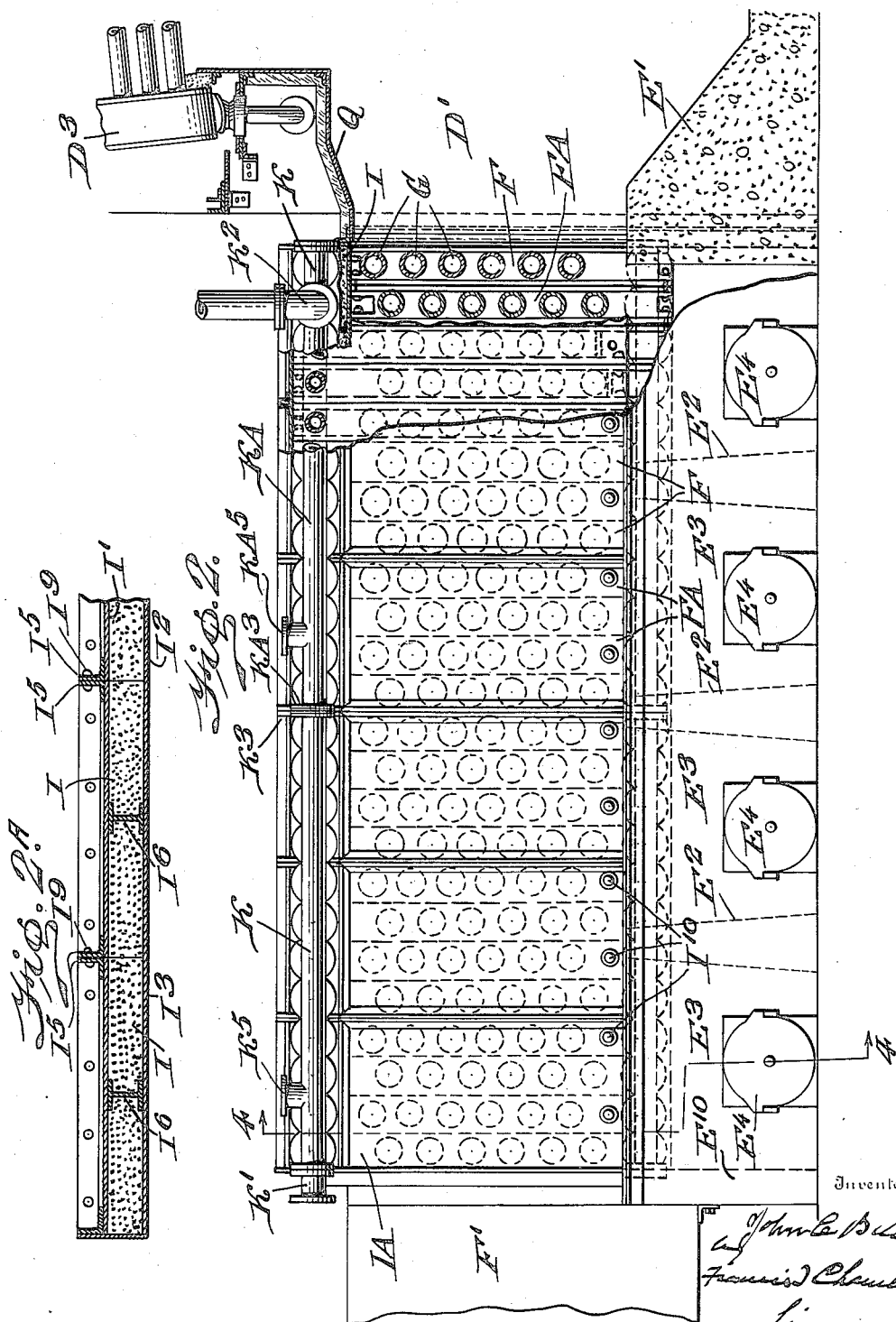

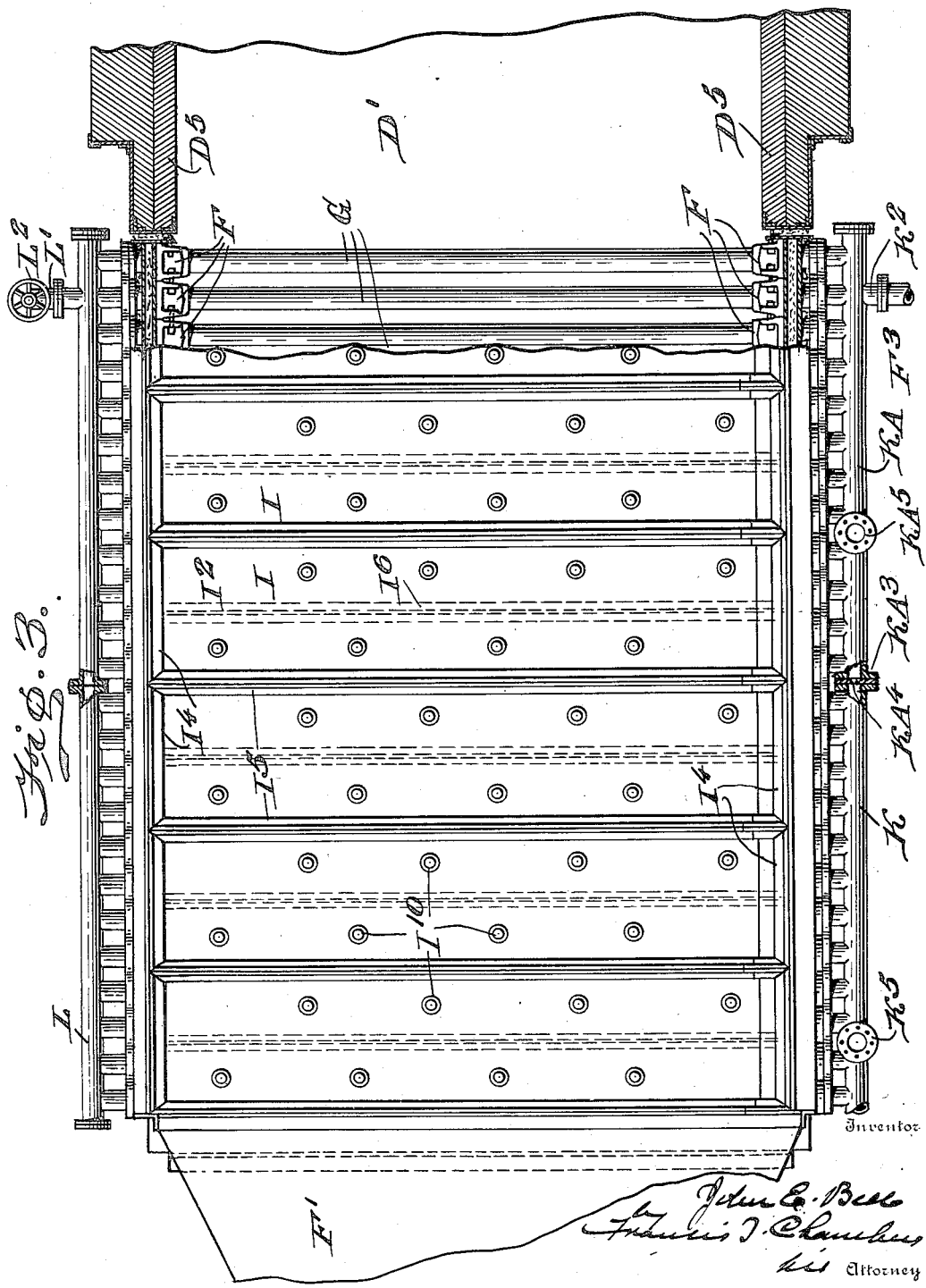

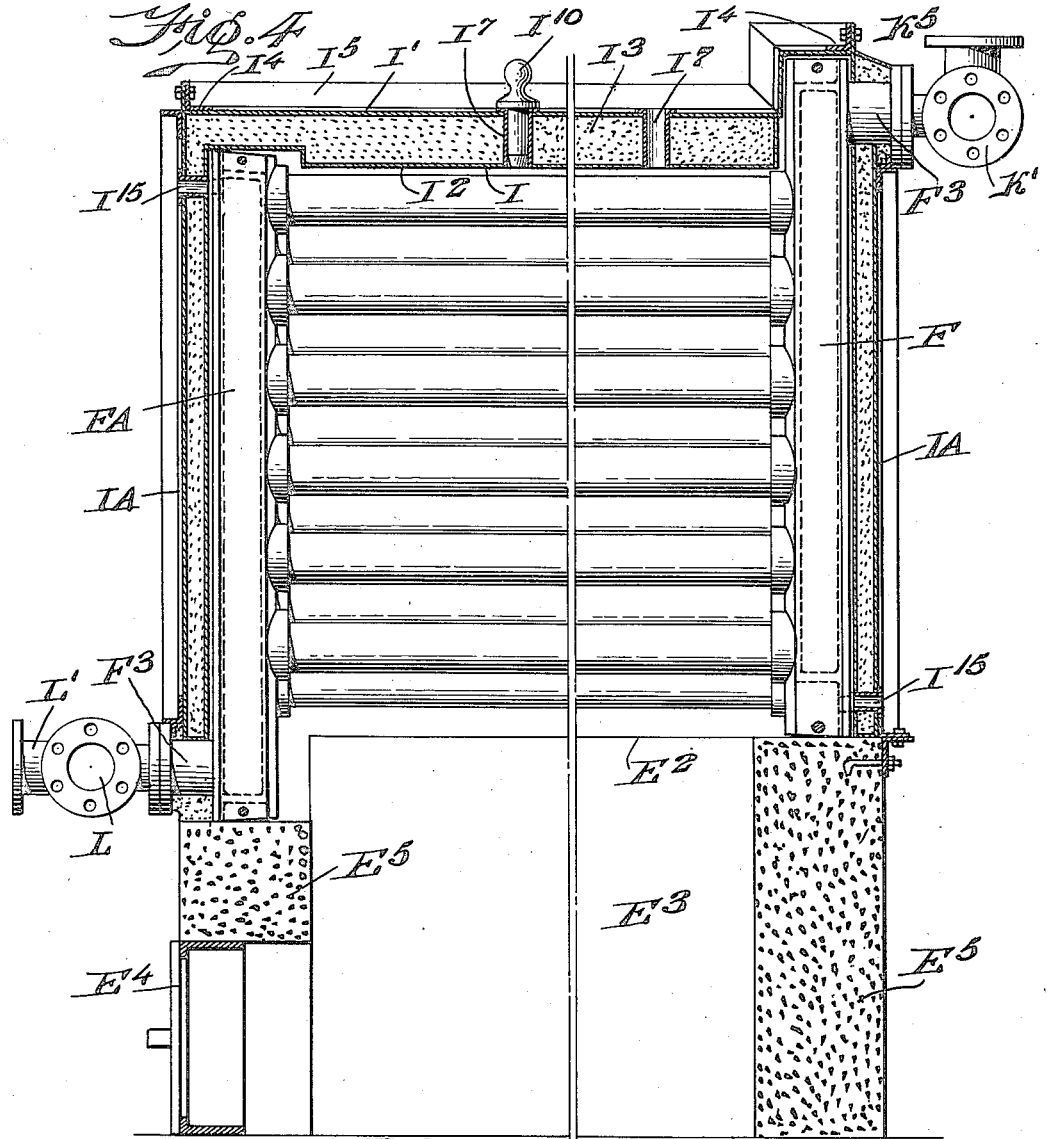
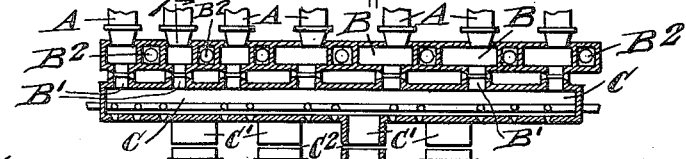

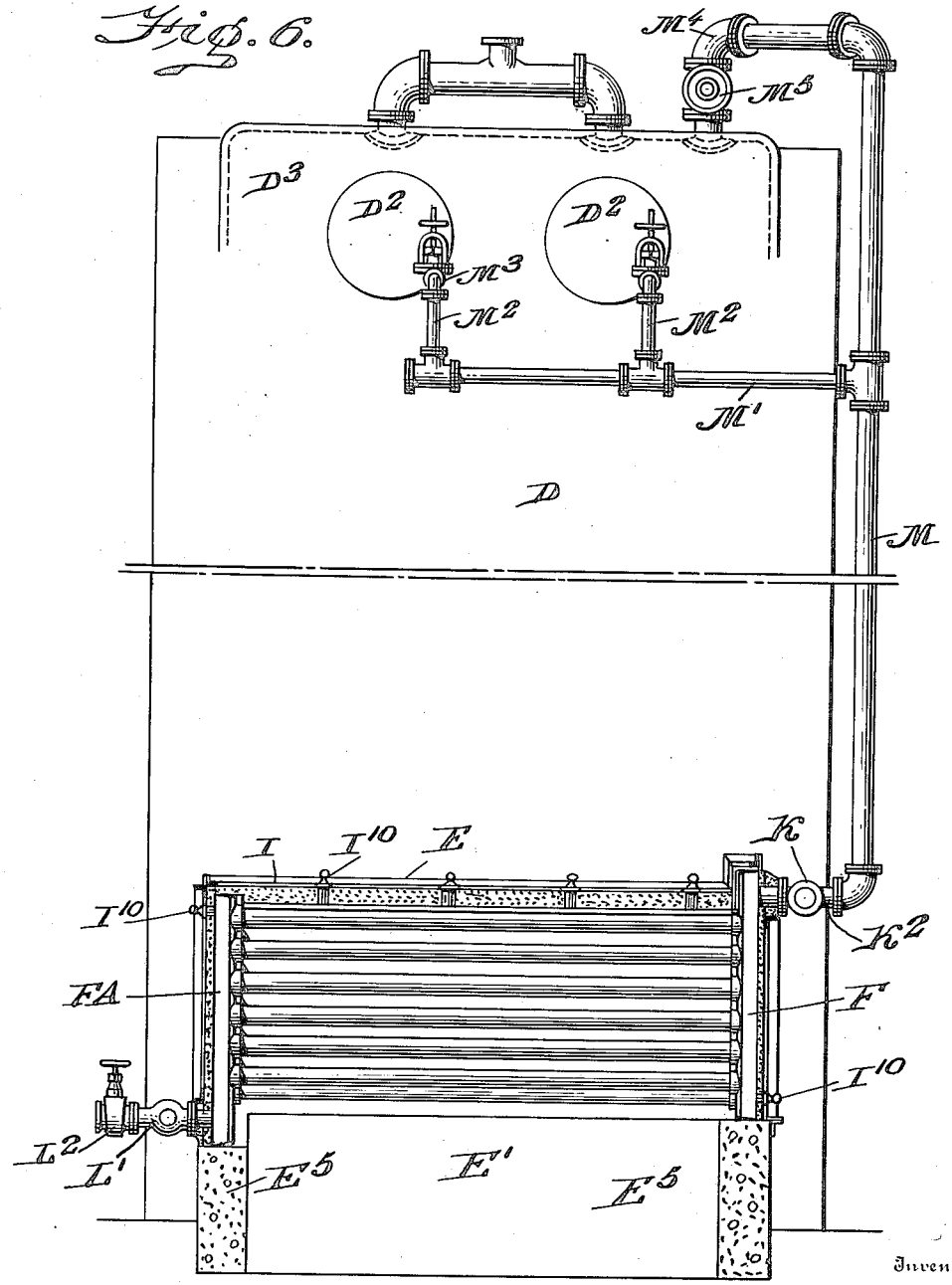

JOHN E. BELL, OF BROOKLYN, NEW YORK.

WASTE-HEAT ECONOMIZER.

1,423,826.  Specification of Letters Patent.  Patented July 25, 1922.

Application filed October 8, 1918. Serial No. 257,408.

*To all whom it may concern:*

Be it known that I, JOHN E. BELL, a citizen of the United States of America, and resident of Brooklyn, in the county of Kings and State of New York, have invented a certain new and useful Improvement in Waste-Heat Economizers, of which the following is a true and exact description, reference being had to the accompanying drawings, which form a part thereof.

My present invention comprises improvements in the construction of water heaters especially devised for use as so called economizers in waste heat boiler furnace systems and it also comprises improvements in the manner in which the economizers are arranged and connected into such a system.

The general object of my invention is to provide an improved economizer construction and arrangement especially adapted for the particular use specified. One specific object of the invention is to provide a simple, compact and effective economizer construction and arrangement adapted to minimize heat losses, both through heat radiation and air leakage notwithstanding the relatively high draft suction which the effective use of such economizers require.

The rapid travel of the dust laden waste heating gases through the economizers which my improved economizer construction and arrangement permits not only increases the heat abstracting efficiency of the economizer tubes, but materially reduces the accumulation of dust on the conducting surfaces and in the restricted gas passages of the economizers, but, in most installations, will not entirely eliminate such accumulations, and one of the specific objects of the invention is to provide for the ready clearing of dust from the economizers by provisions not materially increasing the tendency of air leakage into the apparatus. Still another specific object of the invention it to provide circulating connections between the economizer and the boiler supplied by it with preheated feed water which will be free from water hammer troubles notwithstanding the occasional generation of steam in the economizers which will occur with the efficient heat abstraction properties of my economizer arrangement.

The various features of novelty which characterize my invention are pointed out with particularity in the claims annexed hereto and forming a part of this specification. For a better understanding of the invention, however, and of the advantages possessed by it, reference should be had to the accompanying drawings and descriptive matter in which I have illustrated and described a preferred embodiment of my invention.

Of the drawings:

Figure 1 is an elevation, with parts broken away and in section, on the line 1—1 of Figure 5 of the waste heat furnace system in which my economizer is used.

Figure 2 is an elevation of the economizer portion of the plant shown in Figure 1, with parts broken away and in section.

Figure $2^A$ is a partial vertical section through the roof covering of the economizer.

Figure 3 is a plan view, with parts broken away and in section, of the apparatus shown in Fig. 2.

Figure 4 is a section taken on the line 4—4 of Figure 2.

Figure 5 is a diagrammatic plan of the waste heat furnace system.

Figure 6 is a rear elevation of one of the boilers of the system shown in Figs. 1 and 5, with the economizer shown in section.

Figure 7 is a somewhat diagrammatic elevation taken similarly to Figure 6 showing a modified arrangement.

Figure 8 is a section taken similarly to Fig. 2, but on a larger scale and showing a portion only, of the apparatus shown in Fig. 2, and Figure 9 is a section taken similarly to Fig. 3, but on a larger scale and showing a portion only, of the apparatus shown in Fig. 3.

In the waste heat furnace system shown in Figs. 1 and 5, in which I have illustrated the use of my improved economizer arrangement, there are a plurality of rotary cement kilns A, connected to a common bus channel C through individual headers B and damper control passages B'. Associated with each header B is a corresponding stack $B^2$ which is sealed off from the corresponding header when hot products of combustion leaving the kiln are passed to the bus channel C. Connected to the bus channel C by damper controlled passages C' are a plurality of waste heat boilers D. Each boiler D may be disconnected from the bus channel C when desirable by means of a damper inserted in the kerf $C_2$ formed in the wall of the corresponding channel C' and normally sealed by a clay luting C³ as indicated in Fig. 1. As shown, each boiler D is a four pass water tube boiler with the outlet D' from the chamber which is traversed by the water tubes of the boiler and through which the products of combustion sweep, connected to the inlet of a corresponding economizer E. Each economizer is connected by a breeching F' to a draft inducing fan F. As shown in Fig. 5, separate fans F are provided for the right hand pair of economizers E, and a single fan F is provided for the left hand pair of economizers.

The economizer E, in the preferred construction illustrated, is formed of a series of units, each consisting of a vertical row of horizontal water tubes G and a pair of vertical headers F and FA, to which the ends of the tubes G in each vertical row are connected. The headers F and FA are formed with machined side edges F' (see Fig. 9), and in the assembled economizer these vertical machined edges F' abut against one another. At its ends each header F is formed with flanges F², which are bolted together by bolts F³. The vertical rows of headers F and FA thus form tight sides of a space rectangular in cross section which is traversed by water tubes G of the economizer and is swept by the hot gases issuing from the corresponding boiler housing through its outlets D'. The slight difference in form between the headers F and FA arises from the fact that the tubes G in adjacent vertical rows are staggered. The flanges F² are made deeper at one end of the headers F than they are in the headers FA. The side wall portions of each economizer formed by the assembled headers F and FA rest upon the economizer foundation walls E⁵. These walls E⁵ may be extensions of the lower portions of boiler housing side walls D⁵. The transverse foundation walls E' and E¹⁰, and intermediate pier walls E₂ form transverse dust collecting pockets E³ out of which the accumulated dust may be removed from time to time through cleanout doors E⁴.

The top wall of the inter tube space of the economizer is closed by means of an air tight heat insulating cover formed of sections I. Each section I consists of upper and lower sheet metal portions I² and I', respectively, which are spaced apart, in the construction shown, by I beams I⁶ (see Fig. 2ᴬ) running midway between the sections, and are connected also by the tubular metallic thimbles I⁷ (see Fig. 4), which form the walls of cleanout openings provided at intervals for the insertion of dust-blowing air jet nozzles. These cleanout openings are normally closed by cast metal pins I¹⁰ having enlarged heads fitting snugly against the upper ends of the corresponding thimble I⁷. The contacting end surfaces of the thimbles I⁷ and heads of plugs I¹⁰ may advantageously be machined to insure tight joints. The space between the sheet metal layers I' and I² is filled by a suitable loose heat insulating material I³, such as kieselguhr. At the side edges the top sheet I² of each section I has secured to it angle bars I⁵, and the adjacent edges of adjacent sections are tightly connected together by rivets I⁹ (see Fig. 2ᴬ), passing through the vertical flanges of the corresponding angle bars. The sectional covers I rest at their ends upon the tops of the economizer headers F and FA. At one side of the economizer the upper ends of the headers F and FA are elevated above the upper ends of the headers at the other side of the economizer. The top sheets I² and the angle bar portions I⁵ of the cover sections I are offset to extend over the tops of the elevated headers, while the insulating filling I³ terminates at the adjacent vertical side of the headers. The angle bars I⁵, at the opposite sides of each cover section, are connected at their ends by transverse angle bar sections I⁴. To limit heat radiation the vertical sides of the economizer proper, formed by the bolted together headers F and FA, are covered by an insulating cover which may be formed of sections IA formed of inner and outer sheets of metal and an intervening body of heat insulating material like the cover sections I. The metallic armor of the cover sections I and IA are bolted, or otherwise suitably connected together at the upper corners of the economizer to insure air tight joints. The right hand vertical heat insulating wall sections IA, as seen in Fig. 4, are formed with cleanout openings I¹⁵ along their lower edges for the insertion of cleanout blast nozzles into the pockets between the flanges F³ of the headers F. Similarly the heat insulating wall sections IA, at the other side of the economizer, are formed with similar cleanout openings at their upper ends. These cleanout openings are closed by pin plugs I¹⁰ like those described for closing the cleanout openings in the top cover sections I. The fan breeching F', which is preferably formed of metal, is connected by air tight joints to the metallic portions of the adjacent cover sections I and IA, and to the end foundation wall E¹⁰ of the economizer.

The headers F and FA, forming the right hand side wall of the economizer, as seen in Figs. 4 and 6, project above the top of the header formed wall of the left hand side of the economizer, and each of the headers composing the right hand wall is formed with a lateral flanged tubular connector F³, which is connected to a horizontal drum formed of two sections K and KA.

The inlet K', for the boiler feed water, is at the end of the drum K, adjacent the fan section F'. The outlet K² for the heated feed water is at the end of the drum section KA adjacent the boiler. The drums K and KA, which are in alignment, and are connected by bolted flanges as shown at $KA^3$, are in restricted communication with each other through the small orifice $KA^4$ (see Fig. 3). Each of the drums K and KA is formed with a flanged connector $K^5$ and $KA^5$ to receive a safety valve, not shown, limiting the pressures in the corresponding drum, and thereby protecting the apparatus from injury in case of dirt clogging corresponding portions of the economizer or the connections between it and the boiler.

The headers F and FA forming the left hand side wall of the economizer, as shown in Figs. 4 and 6, extend below the lower ends of the headers forming the right hand side wall of the economizer and are provided with flanged tubular connectors $F^3$ by which the headers are connected to a mud drum L. The latter is provided at one end with an outlet $L'$ to a blowoff valve $L^2$. The hot water outlet $K^2$, from the circulating drum K, is connected to the boiler by a vertical riser pipe M, and by a branch pipe $M'$. The pipe $M'$ is located below, and is connected to the boiler below the normal water level in the latter. As shown, the branch pipe $M'$ is connected to the boiler by branch pipes $M^2$, each through a valve $M^3$, to a corresponding one of the two steam and water drums $D^2$ of the boiler. The riser pipe M extends above the top of the boiler and is connected through a downturned portion $M^4$ and a valve $M^5$ to the boiler above the water level in the latter. As shown, the downturned pipe connection $M^4$ is connected at its lower end to the top of the rear header $D^3$ of the boiler.

The described construction of the economizer is such that the feed water comes in at $K'$ and passes along the drum header K and down through the rear half of the sections made up of headers and horizontal tubes to the bottom header or drum L, from which it passes upward through the front set of sections to the drum KA and thereto to the boiler. The approximate counter current flow of water through the section and of heating gases through the flue space of the economizer is distinctly advantageous and the provision of a restricted passage such as $KA^4$ between drums K and KA prevents the accumulation of air or steam in drum K and the occurrence of water hammer or prevention of proper flow of water.

With the described connection between the economizer and boiler, the heated water leaving the economizer, normally passes into the boiler below the water level therein through the branch pipe $M'$ and pipe branches $M^2$ and valve $M^3$. In case of steam generation in the economizer, as may occur from time to time, the steam entering the riser M with the hot water passes into the steam space of the boiler through the upper portion of the riser M and the downturned portion $M^4$ thereof. This arrangement prevents water hammer in the piping connecting the economizer to the boiler.

Where, as may sometimes be the case, the economizer EA is located above the boiler DA, as shown in Fig. 7, the hot water outlet $E^{20}$ from the economizer may advantageously be connected to the boiler below the water level therein through a downwardly extending portion of a riser pipe $M^{10}$ into which the pipe $E^{20}$ is connected, this riser being connected at its lower end to the steam and water drums $D^{10}$ of the boiler through a lateral pipe portion $M^{11}$ and branches $M^{12}$. The portion of the riser pipe $M^{10}$ above the connection $E^{20}$, is connected to the steam space of the boiler DA through the looped pipe portion $M^{14}$. This arrangement insures the same separation of steam and water leaving the economizer, and the separate introduction of the steam into the steam space, and the water into the water space of the boiler as is obtained with the arrangement shown in Fig. 6.

Each side wall of the economizer is connected to the adjacent edge of the corresponding side wall (See Figs. 3 and 9) of the boiler housing by an air tight heat insulting joint formed, as shown, of heat insulating material $P^5$, such as kieselguhr, packed between the adjacent edge of the boiler housing wall $D^5$ and a metallic plate P which is bolted to the adjacent header F or FA, and is riveted to angle bars secured at the outer side of the adjacent side wall housing section IA. Preferably an angle bar $P'$ is secured to each plate P at its inner edge and forms a stop for the insulting filling. The economizer housing is connected to the boiler housing above the outlet passage $D'$ by a metal plate Q (See Figs. 8 and 9) connected at one end to the boiler housing and connected at the other end through an angle bar $Q'$ to a metallic plate $P^{10}$ lying in the same plane as the plate P and secured to the angle bar $I^5$ of the adjacent cover section I. The plate Q is covered by insulating material, such as kieselguhr, or the like.

It will be apparent to those skilled in the art that the economizer construction and arrangement described and illustrated is well adapted to accomplish the hereinbefore expressed objects of my invention. The rectangular cross section of the economizer inter-tube space, and the outlet $D'$ from the boiler housing, which is most conveniently made rectangular in outline, are made to conform in shape to one another. This permits the economizer to be directly connected to the boiler furnace outlet $D'$. The packing $P^5$, shown in Fig. 9, between the side walls of the economizer and the boiler housing need be made only thick enough to avoid difficulties from thermal expansion and contraction of the apparatus and may easily be made impervious to air leakage. The economizer construction and arrangement lends itself to a relatively rapid flow of the heating gases through the boiler proper and economizer. This adds markedly to the efficiency of the system as a whole and the increase in efficiency thus made possible is, in many installations, an essential to the practical utility of waste heat recovery. The relative high speed of travel of the heating gases directly augments the heat abstracting capacity and efficiency of the boiler tubes and economizer tubes, and indirectly adds to their efficiency by permitting of a reduction in the required amount of tube surface, which not only reduces the cost of construction and the amount of space occupied, but also directly increases the efficiency by reducing heat radiation losses and the tendency to air leakage. The high rate of travel of the heating gases also adds to the efficiency of the waste heat boiler system by reducing undesirable accumulations of dust from the waste heat furnace gases on the active heat abstracting surfaces and in the restricted passages for the heating gases. The necessity for the rapid travel of the hot gases is augmented by the fact that both the headers F and FA, and the tubes G, are preferably made of cast iron, to better withstand the corrosive action of the furnace gases, but, of course, cast iron tubes are less effective heat absorbing devices than are tubes of wrought metal.

The high rate of travel of the heating gases involves a relatively high frictional resistance to the passage of the heating gases, and a correspondingly high draft suction to keep the heating gases in motion at the desired speed. In the practical use of such a waste heat furnace system as is illustrated in the drawings, the draft suction at the outlet end of the economizer may advantageously be made as high as from 4 inches to 10 inches of water, as compared with an ordinary power plant draft suction of about 1 inch of water. With such a high draft suction the tendency to air leakage into the system is very great. Any appreciable air leakage into such a system is vital to its operating efficiency. The air thus leaking in adds materially, of course, to the power consumption of the draft inducing fans, but what is far more important it appreciably lowers the temperature of the hot gases, and thus reduces to a very substantial degree, the amount of heat which it is practicable to abstract by the water tubes.

With my present invention I reduce the tendency to air leakage by reducing the extent of the exposed surfaces through which such leakage can take place and by providing practically air tight walls for the economizer. The described provisions for cleaning the economizer from time to time, are simple and effective and are of a kind to facilitate the maintenance of tight joints and an avoidance of air leakage. The circulating provisions between the economizer and boiler described are of especial importance in connection with my improved economizer construction and arrangement because with it, heat will be absorbed by the tubes rapidly enough in ordinary installations, to insure a substantial generation of steam in the economizer from time to time, with a consequent tendency to water hammer where the ordinary economizer and boiler connections are used. This tendency to water hammer is entirely eliminated with the special circulating connections described.

Certain novel features of the construction and arrangement of the waste heat furnace system as a whole, disclosed but not claimed herein, are disclosed and claimed in my Patents No. 1,311,436, dated July 29, 1919, and No. 1,393,738, dated Oct. 18, 1921.

While in accordance with the provisions of the statutes I have illustrated and described the best forms of apparatus embodying my invention now known to me, it will be apparent to those skilled in the art that changes may be made in the apparatus disclosed without departing from the spirit of the invention as set forth in the appended claims, and that certain features of the invention may sometimes be used to advantage without a corresponding use of other features.

Having now described my invention, what I claim as new and desire to secure by Letters Patent, is:

1. A horizontal economizer having side walls formed of long and narrow headers set vertically and in contact with each other to form solid unbroken side walls, in combination with vertical rows of horizontal water tubes connecting oppositely disposed vertical headers so as to form with said headers a series of economizer sections, a heat insulating top wall supported on the tops of the vertical headers and means for supplying water to the headers on one side of each section and for carrying off the heated water from the opposite headers.

2. A horizontal economizer having side walls formed of long and narrow headers set vertically and in contact with each other to form solid unbroken side walls, in combination with vertical rows of horizontal water tubes connecting oppositely disposed vertical headers so as to form with said headers a series of economizer sections, a heat insulating top wall supported on the tops of the vertical headers, means for supplying water to the headers on one side of each section and for carrying off the heated water from the opposite headers and dust collecting chambers located below the tube space of the economizer.

3. A horizontal economizer having side walls formed of long and narrow headers set vertically and in contact with each other to form solid unbroken side walls, in combination with vertical rows of horizontal water tubes connecting oppositely disposed vertical headers so as to form with said headers a series of economizer sections the tube rows of each section being staggered with respect to the tube rows of adjacent sections, a heat insulating top wall supported on the tops of the vertical headers, means for supplying water to the headers on one side of each section and for carrying off the heated water from the opposite headers and dust collecting chambers located below the tube space of the oconomizer.

4. A horizontal economizer having side walls formed of long and narrow headers set vertically and in contact with each other to form solid unbroken side walls, in combination with vertical rows of horizontal water tubes connecting oppositely disposed vertical headers so as to form with said headers a series of economizer sections, a heat insulating top wall supported on the tops of the vertical headers, said top walls being formed with multiple openings to give passage to a steam gun for cleaning the tubes and means for supplying water to the headers on one side of each section and for carrying off the heated water from the opposite headers.

5. An economizer comprising in combination a series of sections each made up of two headers connected together by tubes, a drum header connected to a source of water supply and to the upper ends of one of the headers of each of the rear half of the sections, a second drum header connected to the similarly disposed ends of the front header sections, and in communication with the first header through a restricted passage, said second drum header being adapted to connect with a boiler, and a third drum header connected with the bottoms of the headers on the opposite side of the sections.

JOHN E. BELL.